(12) United States Patent
Brevini et al.

(10) Patent No.: US 11,499,858 B2
(45) Date of Patent: Nov. 15, 2022

(54) PROPORTIONAL VOLUMETRIC DOSER WITH IMPROVED DOSING REGULATION

(71) Applicant: MIXTRON S.R.L., Reggio Emilia (IT)

(72) Inventors: Renato Brevini, Reggio Emilia (IT); Stefano Brevini, Reggio Emilia (IT)

(73) Assignee: MIXTRON S.R.L., Reggio Emilia (IT)

( * ) Notice: Subject to any disclaimer, the term of this patent is extended or adjusted under 35 U.S.C. 154(b) by 811 days.

(21) Appl. No.: 16/423,366

(22) Filed: May 28, 2019

(65) Prior Publication Data

US 2020/0379489 A1 Dec. 3, 2020

(51) Int. Cl.

| | |
|---|---|
| *G01F 11/00* | (2006.01) |
| *G01F 11/02* | (2006.01) |
| *G05D 11/02* | (2006.01) |
| *G01F 11/32* | (2006.01) |
| *G01F 15/00* | (2006.01) |
| *B01F 35/80* | (2022.01) |
| *B01F 35/88* | (2022.01) |

(52) U.S. Cl.
CPC ............ *G01F 11/021* (2013.01); *B01F 35/80* (2022.01); *B01F 35/8811* (2022.01); *B01F 35/8822* (2022.01); *B01F 35/88222* (2022.01); *G01F 11/32* (2013.01); *G01F 15/005* (2013.01); *G05D 11/02* (2013.01)

(58) Field of Classification Search
CPC B01F 35/80; B01F 35/88222; B01F 35/8811; B01F 35/8822; G01F 11/021; G01F 11/32
See application file for complete search history.

(56) References Cited

U.S. PATENT DOCUMENTS

| | | | | |
|---|---|---|---|---|
| 5,234,322 A | * | 8/1993 | Daniels | B01F 35/88222 417/403 |
| 5,839,617 A | * | 11/1998 | Cater | G01F 11/028 222/321.9 |

* cited by examiner

*Primary Examiner* — Anshu Bhatia (74) *Attorney, Agent, or Firm* — Browdy and Neimark, PLLC (57) ABSTRACT

The invention relates to a proportional volumetric doser (10) comprising a motor (20) to which a pump (30) is connected, which pump (30) comprises a tubular sleeve (80) inside which a cylinder (85) is housed in which a small doser piston (62) slides, mechanically connected to an output shaft of the motor (20), wherein an inner surface of the cylinder (85) and the small piston (62) partially define a dosing chamber (48) of an auxiliary fluid to be mixed in the motor (20) in a prefixed amount with the main fluid, where said cylinder (85) has a threaded outer portion that meshes with a threaded portion of a ring nut (70) so that a rotation of the ring nut (70) causes an axial translation of the cylinder (85) and the variation of the volume of the dosing chamber (48), said proportional volumetric doser (30) being characterized in that the sleeve (80) comprises a locking system (100) configured to mechanically lock the cylinder (85) with respect to the tubular sleeve (80) by creating a shape constraint.

11 Claims, 7 Drawing Sheets

PROPORTIONAL VOLUMETRIC DOSER WITH IMPROVED DOSING REGULATION

FIELD OF THE INVENTION

The invention relates to a proportional volumetric doser with improved dosing regulation.

KNOWN PRIOR ART

As is known, a proportional volumetric doser is a device that allows a first fluid, normally water, to be mixed with a second fluid, for example containing an additive or active ingredient for a variety of applications in the industrial and agricultural field.

Said dosers operate without the need to be connected to sources of electrical energy, but only due to the effect of the pressure and flow rate of the water.

Volumetric dosers can be used in a variety of applications in all sectors in which it is necessary to mix with precise proportions a main fluid with an auxiliary fluid or an additive. The main fluid may typically be water and the auxiliary fluid may be, according to the applications, oils, fertilizers, detergents, chemical products or products intended for the pharmaceutical industry in solution or the like according to the application sector of the doser.

Application sectors of dosers according to the present patent application may be the sector of mechanical processing, water treatment, fertilization and irrigation, washing cars, the food, chemical or pharmaceutical industry or the like.

Such dosers have a motor inside which a piston is made to translate.

The lower portion of the body of the motor has an inlet conduit for the main fluid and an outlet conduit for the mixed fluid.

Below the body of the motor there is a sleeve inside which a dosing chamber is provided for an auxiliary fluid to be mixed in a prefixed amount with the main fluid and the volume of which can be regulated manually as explained below.

The upwards and downwards movement of the motor piston is communicated to a small doser piston, where said small piston slides within the dosing chamber and sucks into said chamber the auxiliary fluid to be mixed with the main fluid.

Because, due to the effect of the mechanism described above, the stroke of the small doser piston is constant, the regulation of the quantity of auxiliary fluid that is first sucked and then injected into the motor body is performed precisely by regulating the volume of the dosing chamber. In particular, the regulation of the volume of the dosing chamber is performed by varying the axial position of a cylinder housed within the sleeve and provided with an axial cavity in which the doser piston slides.

Once the desired position of the cylinder has been determined, it is locked in position through a nut/counternut system that enables the locking in the axial direction of the cylinder with respect to the sleeve.

A problem of this solution consists of the fact that the clamping of the locking system determines relative movements of the cylinder with respect to the sleeve and therefore a variation of the volume of the dosing chamber, which makes the regulation of the quantity of auxiliary fluid to be mixed with the main fluid imprecise and inconvenient.

A further problem of such solution is the possibility of accidental loosening of the locking system, e.g. following improper regulation by the operator and/or due to vibrations and/or the presence of oil in the locking system.

An object of the present invention is that of obtaining improved precision in the determination of the quantity of auxiliary fluid to be mixed with the main fluid, through the creation of more stable and secure locking.

It is a further object of the present invention to obtain the aforesaid result in a rational and cheap manner.

BRIEF SUMMARY OF THE INVENTION

Such purposes are accomplished by the characteristics of the invention given in the independent claim. The dependent claims outline preferred and/or particularly advantageous aspects of the invention.

In particular, the invention makes available a proportional volumetric doser comprising a motor, provided with an inlet conduit of a main fluid and an outlet conduit, and a pump adapted to supply an auxiliary fluid to the motor, which pump comprises a tubular sleeve inside which a cylinder is housed in which a small doser piston slides, mechanically connected to an output shaft of the motor, wherein an inner surface of the cylinder and the small piston partially define a dosing chamber of an auxiliary fluid to be mixed in the motor in a prefixed quantity with the main fluid, where said cylinder has a threaded outer portion that meshes with a threaded portion of a ring nut so that a rotation of the ring nut causes an axial translation of the cylinder and the variation of the volume of the dosing chamber, said proportional volumetric doser being characterized in that the sleeve comprises a locking system configured to mechanically lock the cylinder with respect to the tubular sleeve by creating a shape constraint.

Thanks to such solution the proportional volumetric doser enables quicker and more precise regulation of the volume of the dosing chamber, and therefore a regulation of the amount of secondary fluid to be mixed with the main fluid.

Another aspect of the invention envisages that the shape constraint is created by acting radially on an outer surface of the ring nut.

This aspect contributes to further improving the adjustment precision of the volume of the dosing chamber, as by acting radially on the ring nut to lock the position thereof, the position of the ring nut does not change, and therefore the axial position of the cylinder with respect to the sleeve is not changed.

Yet another aspect of the invention envisages the locking system being able to comprise a lever that has a portion provided with reliefs and/or grooves, adapted to be engaged with a corresponding outer portion of the ring nut, provided with reliefs and/or grooves configured to create a shape constraint with reliefs and/or grooves of the portion.

In this way, the locking system is particularly efficient and precise.

According to an aspect of the invention, the lever is housed in a seat of the tubular sleeve and comprises a hinge and a spring configured to keep the portion of the lever in contact with the outer portion of the ring nut.

In this way, the practicality of the doser is increased as the spring, when an operator does not act manually on the lever, automatically brings the portion provided with reliefs and/or grooves into contact with the outer portion provided with conjugated reliefs and/or grooves, locking the ring nut in the position reached.

An aspect of the invention, which may be independent or additional with respect to the presence of the spring acting on the lever, envisages that the doser can comprise a safety device selectively activatable between a first position, in which it generates on the lever a force such as to keep the portion of the lever in contact with the outer portion of the ring nut, and a second position, in which it allows radial clearance between said portions.

In this way the safety of the locking device is further improved. In particular, it can prevent the accidental unlocking of the lever.

For example, the safety device can be regulated in the intensity of the force generated on the lever when activated in the first position.

According to yet another aspect of the invention, the ring nut has an enlarged end that is housed in a conjugated annular hollow obtained in an enlarged end portion of the tubular sleeve with which a closing cover is associated, configured to keep the enlarged end of the ring nut in the annular hollow obtained in an enlarged end portion of the tubular sleeve.

Thanks to this solution the rotation of the ring nut causes the axial translation of the cylinder, in this way varying the volume of the dosing chamber and therefore the quantity of auxiliary fluid contained therein.

Another aspect of the invention envisages that the cylinder comprises a seat for receiving a one-way valve positioned at a distal end from the motor body.

This solution enables the emptying of the dosing chamber to be prevented.

Another aspect of the invention envisages a second one-way valve separated from the first one-way valve by a tube.

Thanks to this solution, the quantity of auxiliary fluid sucked by the small doser piston on a case-by-case basis can be controlled and blocked thus guaranteeing, during the operation of the doser, the constant supply of the auxiliary fluid to the inside of the dosing chamber. Furthermore, this aspect allows the emptying of the tube when not in use to be prevented.

According to a further aspect of the invention, there may be at least one bleed hole.

This characteristic improves the versatility of the doser, as it allows optimal washing more quickly with respect to devices of the prior art. Furthermore, such characteristic allows mixed fluid to be collected in order to perform analyses thereon without the need to disassemble the doser.

According to an aspect of the invention, the motor can comprise a body inside which a piston slides connected to the output shaft of the motor, which divides the internal volume of the body of the motor into a first chamber in communication with the inlet conduit of the main fluid and a second chamber in communication with the outlet conduit, where the first and the second chamber are placed in communication with one another by means of a system of valves associated with the piston and activatable for placing the piston in movement.

BRIEF DESCRIPTION OF THE DRAWINGS

Further features and advantages of the invention will be more apparent in light of the following detailed description with the aid of the accompanying drawing tables, wherein.

DETAILED DESCRIPTION OF SOME EMBODIMENTS OF THE PRESENT INVENTION

The invention will now be described with initial reference to FIGS. 1 and 2 where a proportional volumetric doser can be seen indicated overall with reference number 10.

The proportional volumetric doser 10 has a motor 20 provided with a body with which an auxiliary fluid dispensing pump 30 is associated at the bottom.

The internal volume of the body of the motor 20 is divided into two distinct chambers by a piston 22, i.e. a first chamber 23 in communication with an inlet conduit 24 and a second chamber 25 in communication with an outlet conduit 26 and closed at the top by a cover 21.

The piston 22 is slidably housed in the body of the motor 20 and is movable between a top dead centre, in which the volume of the first chamber 23 is maximum and the volume of the second chamber 25 is minimum, and a bottom dead centre, in which the volume of the first chamber 23 is minimum and the volume of the second chamber 25 is maximum.

The first chamber 23 also has an inlet hole 31 for an auxiliary fluid that is obtained on the body of the motor 20. From the inlet hole 31 an annular shank 28 originates, which projects internally to the body of the motor 20 and the function of which will be described below.

Figure 2:
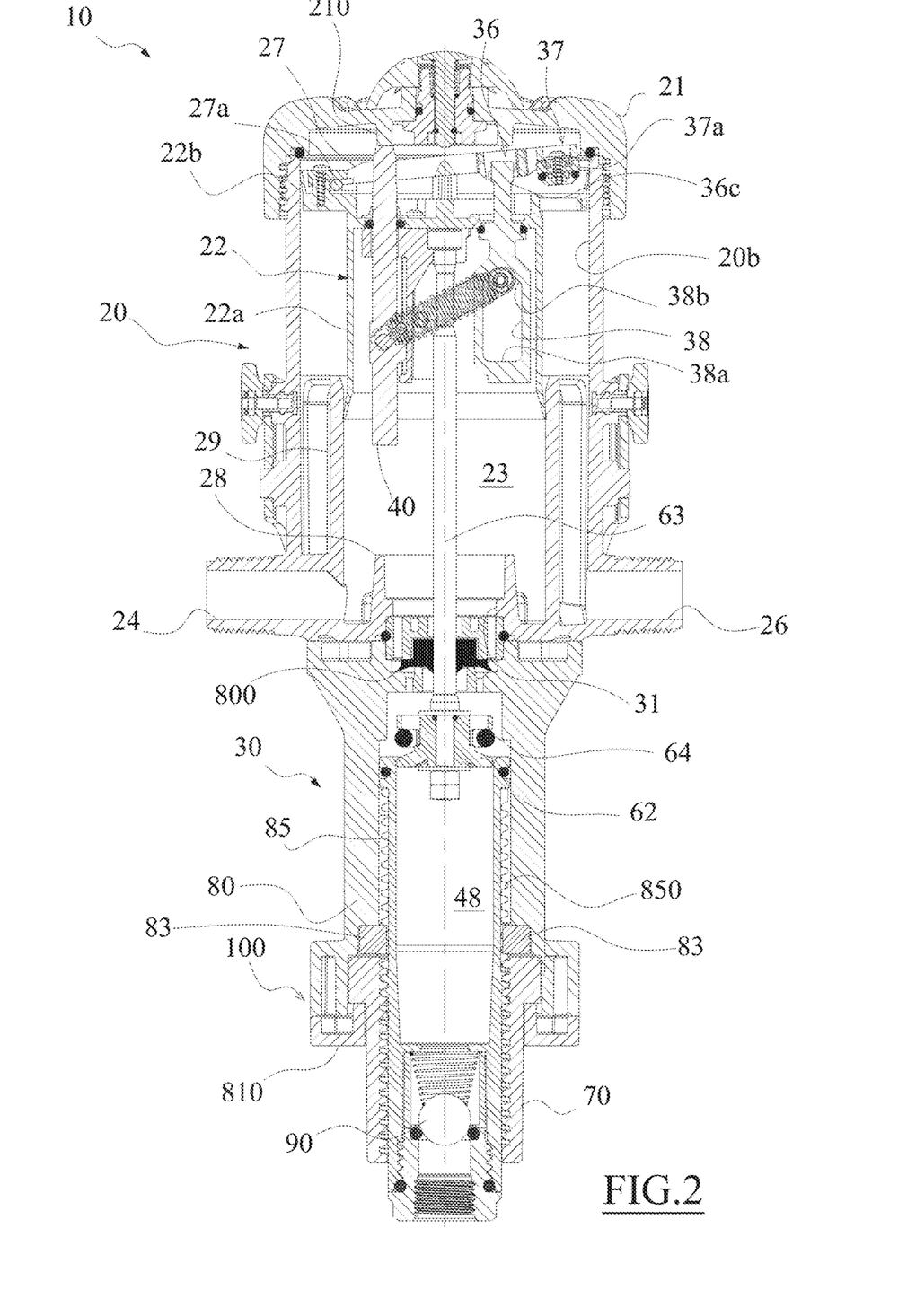
FIG. 2 illustrates a sectional view along a longitudinal plane of the proportional volumetric doser of FIG. 1 in a first operating configuration.
Figure 3:
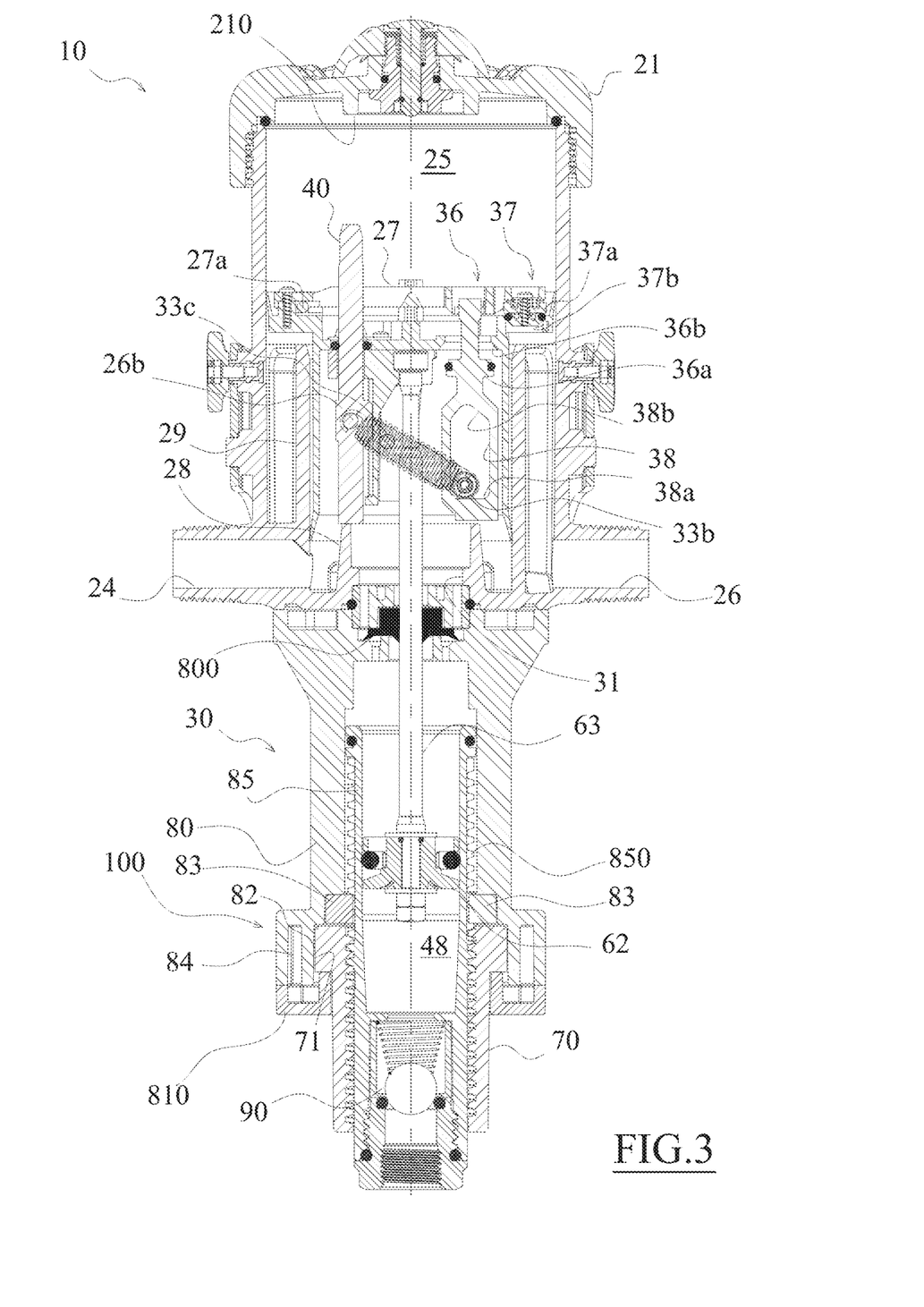
FIG. 3 illustrates a sectional view along a longitudinal plane of a detail of the proportional volumetric doser in a second operating configuration.

With particular reference to FIGS. 2 and 3, in the embodiment illustrated, the piston 22 has a lower portion 22a and an upper portion 22b. The upper portion 22b has a cylindrical shape with a larger diameter than its lower portion 22a and slides in contact, and sealingly, with an inner cylindrical surface 20b, of the body of the motor 20, whereas the lower portion 22a is shaped like a hollow cylindrical shank that originates at the bottom from the upper portion 22b and is obtained and slides in contact with an inner cylindrical wall 29 of the body of the motor.

In more detail, the first chamber 23 is in communication with the inlet conduit 24 for the main fluid and is at least partially defined by a lower portion of the body of the motor 20, by the inner cylindrical wall 29, by the lower portion 22a of the piston 22, and by the shank 28.

The chamber 25 is delimited by an upper portion of the body of the motor 20, by the upper portion 22b of the piston 22 and by the lower surface of the cover 21 of the body of the motor 20.

The first chamber 23, in communication with the inlet conduit 24, and the second chamber 25, in communication with the outlet conduit 26, are placed in communication with each other through a system of valves 36,37.

In particular, the system of valves comprises at least one internal valve 36 and an external valve 37, where the expression internal valve means a proximal valve with respect to the sliding axis of the piston 22 along a radial direction and the expression external valve means a radially more distant valve from the sliding axis of the piston 22 with respect to the internal valve 36.

The internal valve 36 comprises a shutter 36a adapted to engage in a related valve seat 36b and the external valve 37 comprises a shutter 37a adapted to engage in a valve seat 37b.

When the internal valve 36 is closed, the external valve 37 is open and the pressure of the main fluid that enters the inlet conduit 24 pushes the piston 22 upwards causing the outflow of the fluid contained in the chamber 25 towards the outlet conduit 26.

When the piston 22 reaches the top dead centre, the internal valve 36 is opened and simultaneously the external valve 37 is closed. In this way the first chamber 23 is placed in fluid communication with the second chamber 25 and at the same time the piston 22 drops due to the fluid which overflows into the second chamber 25 from the inlet conduit.

The pumping movement of the piston 22 is therefore determined entirely by the pressure of the fluid at the inlet and the mutual opening and closing positions of the valves 36 and 37.

The valves 36 and 37 are associated with a rocker 27 that is articulated, at one end, to the upper surface of the piston 22 so as to perform small oscillations, about an articulation pin 27a thereof, alternatively between a first position, in which the internal valve 36 is closed and the external valve 37 is open, and a second position, in which the internal valve 36 is open and the external valve 37 is closed. In particular, the internal valve 36 is constrained to the rocker 27 through a portion 36c thereof, so that when the rocker 27 rotates from the second to the first position, the portion 36c (FIGS. 2 and 4) of the internal valve 36 is displaced upwards and brings the shutter 36a to close the valve seat 36b.

Figure 4:
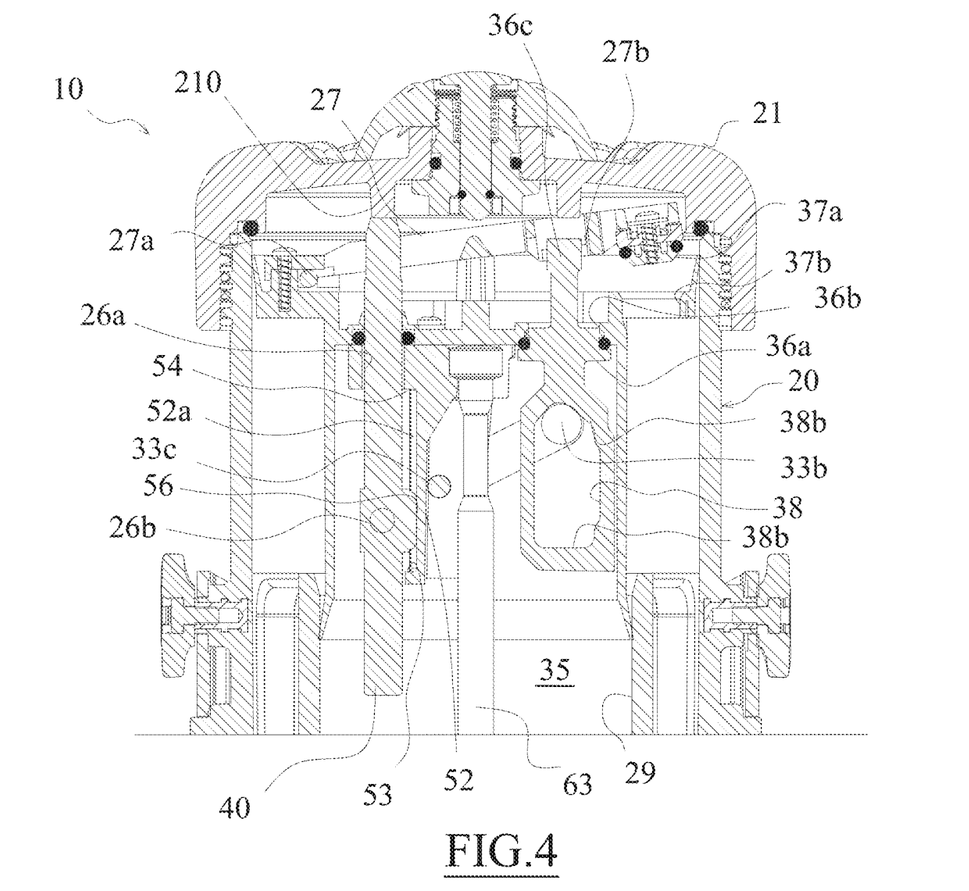
FIG. 4 illustrates a sectional view along a longitudinal plane of an enlargement of a portion of the proportional volumetric doser in the configuration of FIG. 2.

On the other hand, the shutter 37a of the external valve 37 is directly supported by the rocker 27 and, for example, in the position of FIG. 2 or 4, the rocker 27, rotating from the second to the first position, brings the shutter 37a into a distal position with respect to the valve seat 37b, opening the related external valve 37.

In the position of FIG. 3, the rocker 27 is located in the second position and the portion 36c of the internal valve 36 is displaced downwards and the shutter 36a does not engage the valve seat 36b.

Simultaneously, the shutter 37a is in contact with the valve seat 37b and therefore the external valve 37 is closed.

The movement of the rocker 27, which determines the respective opening and closing positions of the internal 36 and external 37 valves, is delegated to a spring activation mechanism.

In the embodiment illustrated the spring activation mechanism is configured to engage in a slot 38, provided with a lower surface 38a and an upper surface 38b, e.g. opposite each other and aligned along a parallel direction to the sliding direction of the piston 22, obtained in a body of the shutter 36a of the valve 36.

Such spring activation mechanism comprises a pair of connecting rods 33 (FIG. 7), where each connecting rod is associated with a respective spring 33a.

Figure 7:
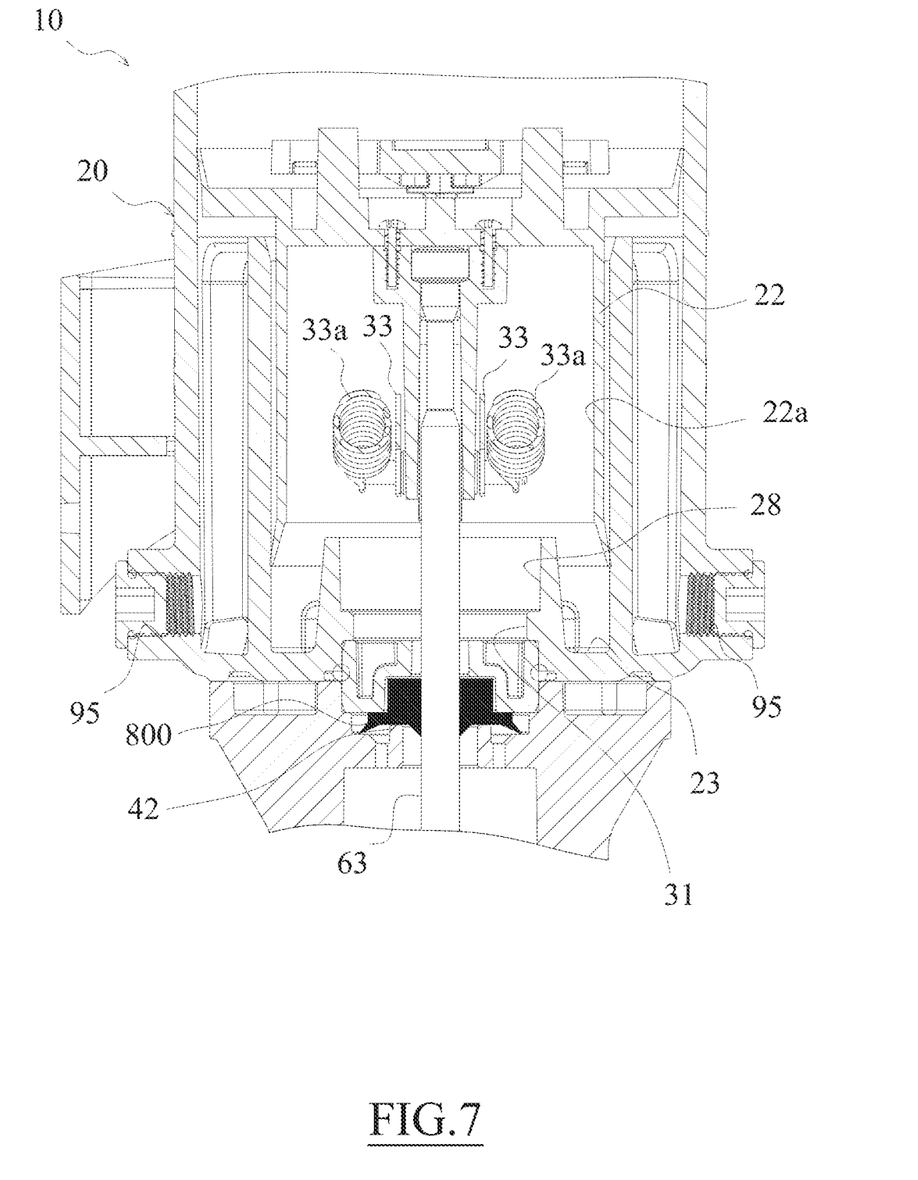
FIG. 7 illustrates a sectional view along a longitudinal plane transversal to the sectional plane of FIG. 2 of an enlargement of a portion of the proportional volumetric doser of FIG. 2.

Each connecting rod is fixed to a respective hinge 33c placed on the piston 22 and, through a hinge 33b, which is housed in the slot 38, to a first end of the respective spring 33a.

In turn the springs 33a are fixed in a second end thereof to a hinge 26b placed on a rod 40 slidably associated with the piston 22 i.e. that is constrained to the piston 22 so as to be able to translate with respect to the piston itself.

In particular, as illustrated in FIG. 4, the rod 40 can slide vertically inside a through hole 26a obtained in the body of the piston 22 itself.

Furthermore, the rod 40 has a raised element 56 constrained to slide within a guide 52 of the piston 22 that terminates at one end with a lower abutment element 53 and at the opposite end with an upper abutment element 54, where said abutment elements 53,54 can alternatively engage with the raised element 56 of the rod 40 to determine the respective stroke ends thereof along the translation axis of the rod 40, an axis which is parallel to the sliding axis of the piston 22.

The position of the rod 40 with respect to the piston 22 causes the activation of the spring activation mechanism and regulates the upwards and downwards stroke of the piston, as will be described below with reference to the operation of the invention.

Figure 1:
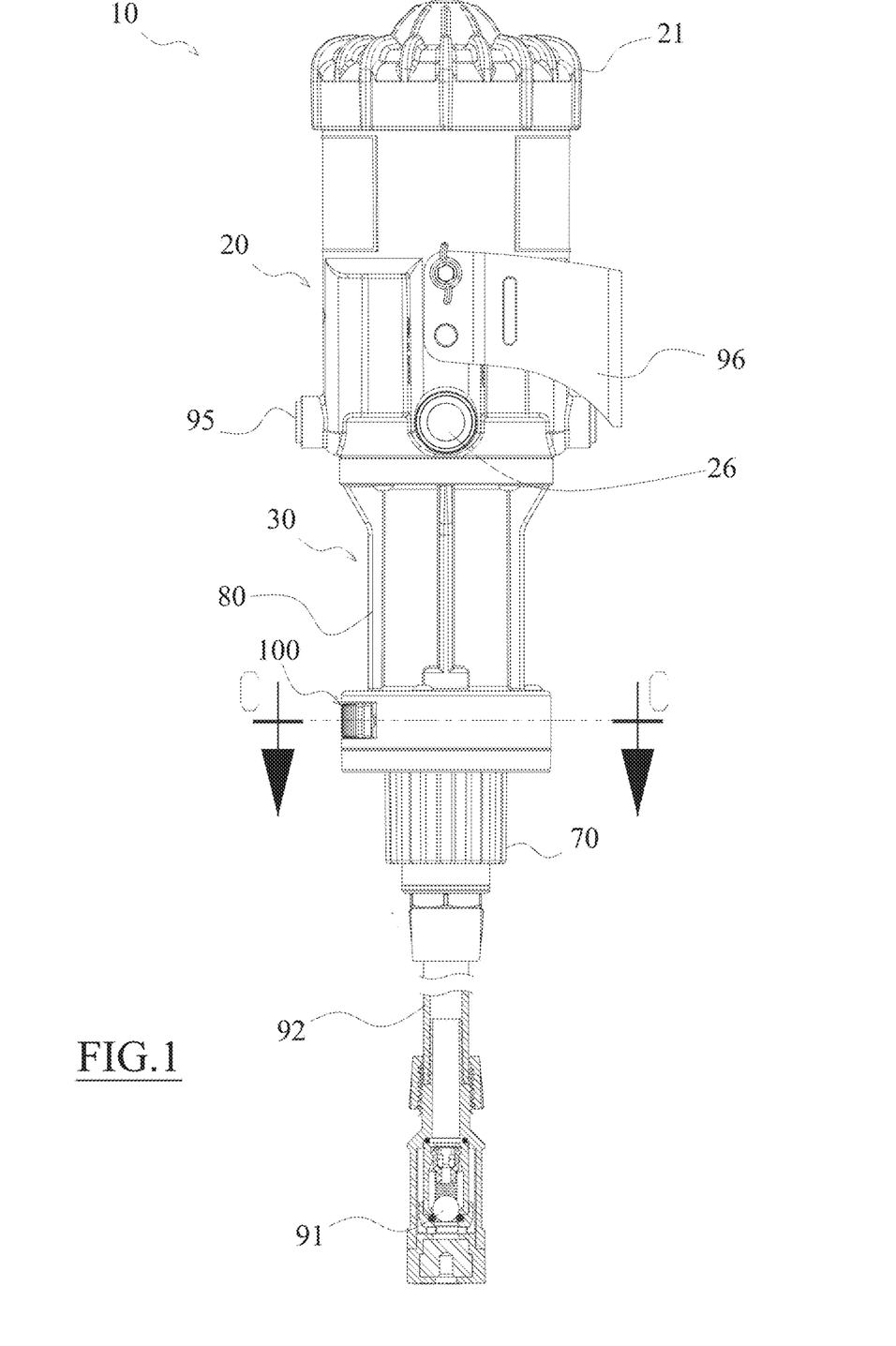
FIG. 1 illustrates a side view of a proportional volumetric doser according to the present invention.

With particular reference to FIGS. 1, 2 and 3 it is noted that below the body of the motor 20 the pump 30 is fixed which, as mentioned, has the function of supplying into the body of the motor 20, and in particular into the first chamber 23, an auxiliary fluid that is mixed with the main fluid introduced into the chamber 23 through the inlet conduit 24.

The pump 30 comprises a tubular sleeve 80 coaxial with the sliding axis of the piston 22 and with the inlet hole 31 for the auxiliary fluid. The tubular sleeve 80 is centrally perforated and has, at a connection end with the body of the motor 20, a housing seat of a one-way diaphragm valve 800, which is placed at the inlet conduit 31 of the secondary fluid and allows the passage of the secondary fluid from the pump 30 to the body of the motor 20.

Inside the tubular sleeve 80 a cylinder 85 is received that has an outer threaded portion 850. The cylinder 85 has, in proximity to an upper end, a housing seat of an annular sealing gasket configured to prevent the passage of fluid between the tubular sleeve 80 and the cylinder 85.

At the distal end from the body of the motor 20, the cylinder 85 has a seat for receiving a one-way valve 90, e.g. (FIGS. 2 and 3) of the spherical type that allows the inlet of secondary fluid into the cylinder 85 but prevents the outlet thereof.

A small piston 62 of the pump 30 slides inside the cylinder 85, which is mechanically and rigidly connected to the piston 22 of the body of the motor 20, i.e. rigidly connected so that the stroke of the small piston 62 is the same as the piston 22. For example, the small piston 62 is mechanically connected to an output shaft of the motor 20.

In particular, the small piston 62 is connected to the end of the output shaft of the motor 20, the other end of which is fixed to the piston 22. Thanks to this configuration the movement of the piston 22 directly causes the movement also of the small piston 62 inside the cylinder 85.

In the embodiment illustrated, the output shaft of the motor 20 comprises a stem 63, which at one end is connected to the small piston 62 and at the opposite end is fixed to the piston 22.

The internal volume of the cylinder 85, together with the small piston 62 partially define a dosing chamber 48 of the secondary fluid. In particular, the volume of the dosing chamber 48 is defined by the small piston 62, by the cylinder 85 and by the valve 90.

With particular reference to FIGS. 1, 2, 3, and 8 it is noted that on the threaded portion 850 of the cylinder 85 an outer ring nut 70 is screwed, which has an enlarged end that is housed in a conjugated annular hollow obtained in an enlarged end portion of the tubular sleeve 80.

A closing cover 810 is associated with the lower end of the tubular sleeve 80, such cover being configured to keep the enlarged end of the ring nut 70 in the annular hollow obtained in an enlarged end portion of the tubular sleeve 80. Thanks to this configuration, and for example at a pair of tongues 83, the rotation of the ring nut 70 causes the axial translation of the cylinder 85, in this way varying the volume of the dosing chamber 48 and therefore the quantity of auxiliary fluid contained therein. In fact, as the stroke of the small doser piston 62 is constant, the regulation of the quantity of auxiliary fluid that is first sucked and then supplied into the motor 20 body is performed precisely by regulating the axial position of the chamber 48 with respect to the cylinder 85.

An external graduated scale (not shown for simplicity purposes) can be applied to the doser 10, e.g. to the cylinder 85, to facilitate regulation.

Figure 5:
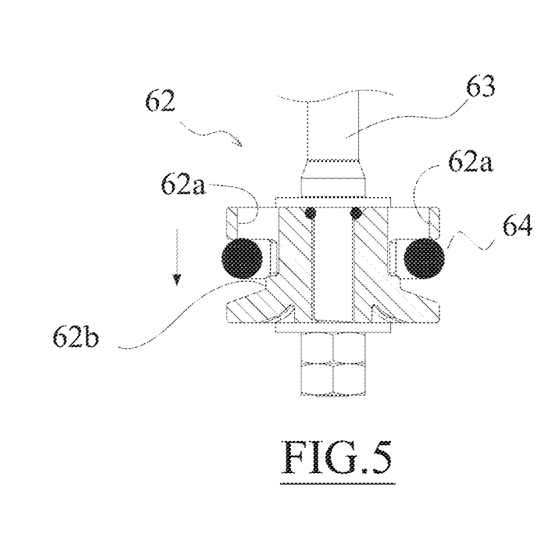
FIGS. 5 and 6 illustrate two different configurations of a detail of the proportional volumetric doser of the previous figures.
Figure 6:
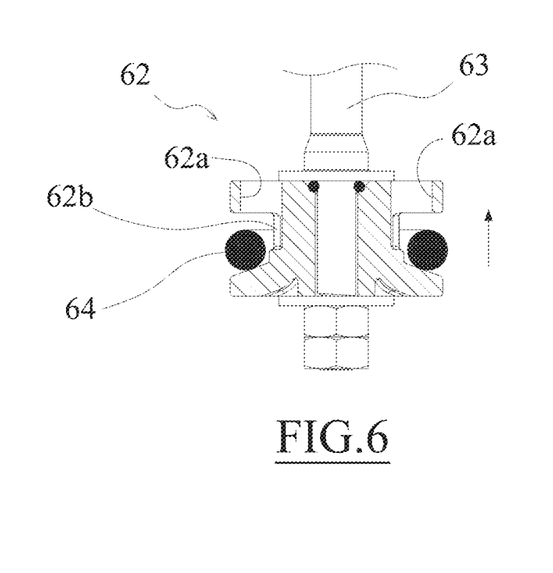

With particular reference to FIGS. 5 and 6, the small piston 62 comprises a plurality of openings 62a, arranged radially with respect to the sliding axis of the small piston 62 itself, for the outflow of the auxiliary fluid contained in the dosing chamber 48 towards the body of the motor 20. A valve is associated with said openings 62a which allows the passage of the auxiliary fluid through them. In the embodiment illustrated, said valve comprises a friction gasket 64, housed in an annular groove 62b of the small piston 62. The friction gasket 64, during the descent of the small doser piston 62, by rubbing along the inner surface of the cylinder 85 (FIG. 5) reaches a position in which it enables the outflow of the auxiliary fluid, previously sucked, through the channels 62a, whereas during the ascent of the small doser piston 62, by rubbing along the inner surface of the cylinder 85, the gasket 64 reaches a position in which it prevents the passage of the auxiliary fluid through the channels 62a, producing at the same time a depression in the chamber 48.

The ascent and descent movement of the small doser piston 62 therefore allows the auxiliary fluid to be sucked into the dosing chamber 48 and to be supplied to the motor 20 body. As mentioned, by acting on the ring nut 70 it is possible to regulate the axial position of the cylinder 85 with respect to the tubular sleeve 80 and therefore to determine the volume of the chamber 48 for dosing the auxiliary fluid to be mixed.

In this way, it is possible to precisely regulate the amount of fluid that is sucked by the small doser piston 62 to each ascent movement of the piston.

Figure 8:
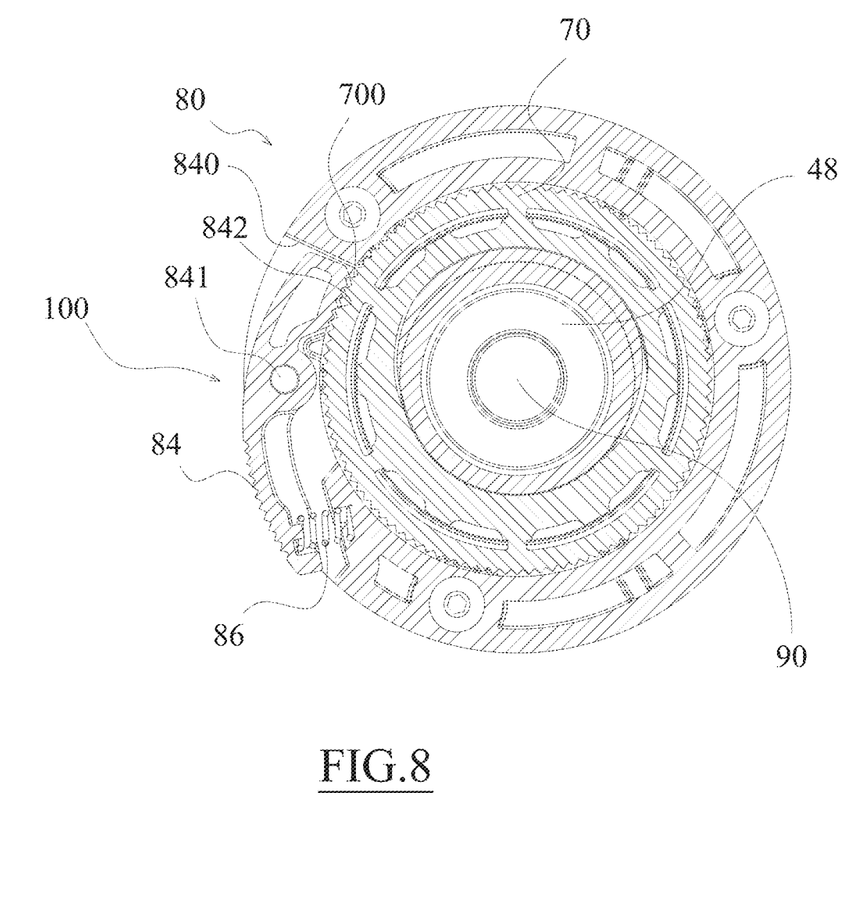
FIG. 8 illustrates a section along the plane C-C of FIG. 1 of the proportional volumetric doser.

The tubular sleeve 80 comprises a locking system 100 configured to mechanically lock the cylinder 85 with respect to the tubular sleeve 80, i.e. configured to mechanically lock the translation of the cylinder 85 with respect to the tubular sleeve 80.

For example, the locking system 100 is configured to mechanically lock the cylinder with respect to the tubular sleeve 80 by creating a shape constraint, i.e. by creating an obstruction connection.

Preferably, the shape constraint, i.e. the obstruction connection, which blocks the relative movement between the cylinder 85 and the tubular sleeve 80 is performed by acting radially on an outer surface of the ring nut 70.

With particular reference to FIG. 8, in the embodiment illustrated, the locking system 100 comprises a lever 84, housed in a seat 840 of the tubular sleeve 80 and that is constrained to the seat 840 of the sleeve thanks to an articulation hinge 841 with a parallel axis to the sliding axis of the small piston 62 and that can therefore rotate with respect to the seat itself.

According to the present embodiment, the said seat is obtained in an enlarged portion of the tubular sleeve 80.

The lever 84 has, at one end, a portion 842 provided with reliefs and/or grooves, e.g. provided with a notching, adapted to engage with an outer portion 700 of the ring nut 70 provided with reliefs and/or grooves configured to create a shape constraint with the reliefs and/or grooves of the portion 842. For example, the outer portion 700 has a notching.

The portion 842 of the lever 84 is kept engaged with the outer portion 700 of the ring nut 70 thanks to a spring 86 placed between a free end of the lever 84, opposite the end that has the portion 842, and a wall of the seat 840.

Thanks to this configuration a lever is created in which the spring 86 is provided with a force to make the lever 84 turn about a hinge 841 to keep the portion 842 in contact with the outer portion 700 of the ring nut 70.

In this way, the ring nut 70 is locked in a desired position on the tubular sleeve 80 obtaining a precise and stable regulation of the volume of the dosing chamber 48.

Furthermore, by pressing the lever against the resistant force of the spring 86 it rotates about the hinge 841 and releases the rotation of the ring nut 70.

Figure 9:
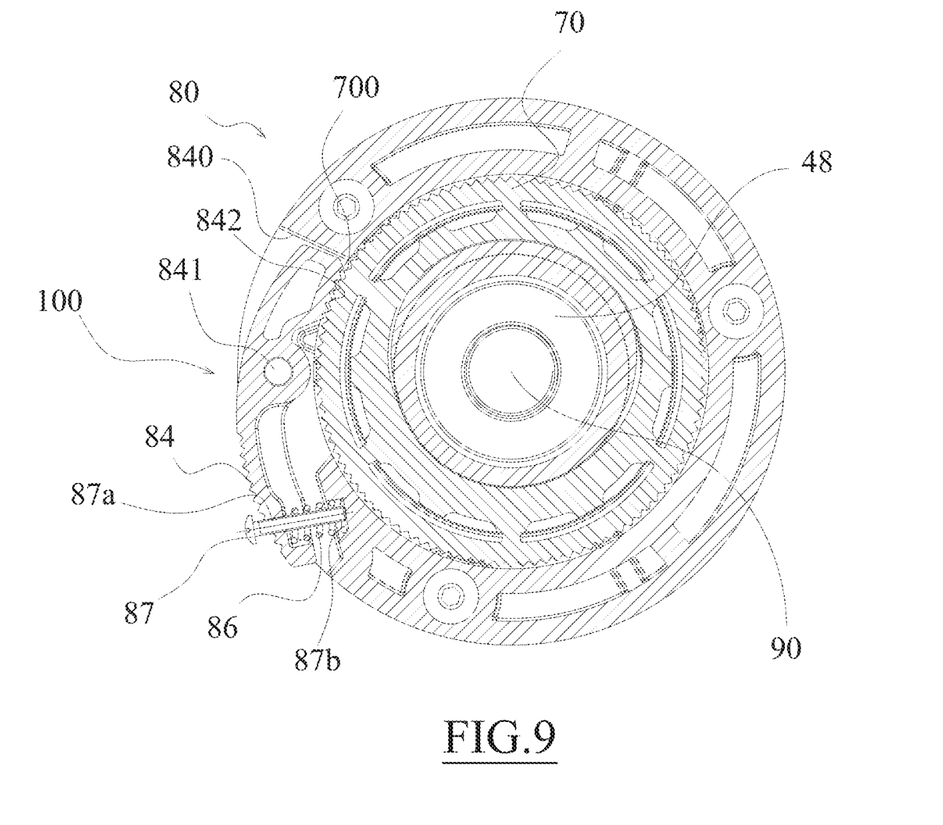
FIG. 9 illustrates a section along the plane C-C of a variant of the proportional volumetric doser provided with a safety device according to the invention.

Alternatively or additionally to the spring 86, the proportional volumetric doser can comprise a safety device selectively activatable between a first position, in which it generates on the lever 84 a force such as to keep the portion 842 of the lever 84 in contact with the outer portion 700 of the ring nut 70, and a second position, in which it allows radial clearance between said portions 842,700. Preferably, the safety device is configured so as to allow a regulation of the force acting on the lever when it is activated in the first position.

In the embodiment illustrated, the safety device comprises a pin 87 provided with a threaded portion adapted to be engaged in a threaded through hole 87a created in the lever 84.

By screwing the pin 87 into the corresponding hole 87a it is possible to activate the safety device from the second position, in which it allows radial clearance between the portions 842 and 700, to the first position, in which an end of the pin 87 contacts an abutment surface 87b of the seat 840 of the tubular sleeve 80 and pushes the lever away from said abutment surface 87b generating on the lever 84 a force such as to keep the portion 842 of the lever 84 in contact with the outer portion 700 of the ring nut 70.

By unscrewing the pin 87 with respect to the hole 87a it is possible to activate the safety device from the first position to the second position.

For example, the pin 87 is provided with a manoeuvring head.

Preferably, the hole 87a is created at the spring 86. In the embodiment illustrated, the hole 87a defines a screwing axis for the pin 87 that lies on a plane perpendicular to the axis of the hinge 841.

The doser 10 also envisages a second one-way valve 91 separated from the first one-way valve 90 by a tube 92, with the advantage that, when said tube 92 is full, the amount of auxiliary fluid sucked by the small doser piston 62 can be precisely controlled on a case-by-case basis guaranteeing, during the operation of the doser, the constant supply of the auxiliary fluid into the dosing chamber 48.

On the body of the motor 20 there is also at least one bleed hole 95 (visible in FIG. 1), preferably two bleed holes 95, e.g. in fluid connection with the outlet conduit 26.

Each bleed hole allows the pump body to be emptied to proceed with the washing of the doser 10 and to collect a portion of the fluid in communication with the outlet conduit 26 for measuring operating parameters of the motor 20 such as, for example, the concentration of auxiliary fluid in the main fluid.

Furthermore, the doser 10 comprises a fixing bracket 96 connected through screws to the motor 20 body.

The operation of the proportional volumetric doser 10 takes place according to the following methods.

Starting from the position of the piston 22 illustrated in FIG. 3 when the main fluid is supplied into the chamber 23 through the inlet conduit 24 the piston 22 is in the bottom dead centre and is pushed due to the effect of the main fluid towards the top dead centre. In fact, in this position the internal valve 36 of the piston 22 is closed and the external valve 37 is open and the main fluid exercises a pressure on part of the lower surface of the upper portion 22b of the piston 22 which translates towards the top dead centre.

The movement towards the top dead centre of the piston 22 also draws the stem 63 of the small doser piston 62 and the friction gasket 64 reaches the position, indicated in FIG. 6, in which it hermetically closes the space between said gasket 64 and the inner surface of the cylinder 85 preventing the outflow of the auxiliary fluid through the channels 62a and therefore so as to pump a predefined amount of auxiliary fluid into the body of the motor 20, an amount that depends on the volume of said dosing chamber 48 previously regulated.

The movement towards the top dead centre of the piston 22 draws with it also the rod 40, the raised element 56 of which is kept in abutment against the upper abutment element 54 of the guide 52 of the piston 22.

The ascent movement of the rod 40 continues until the rod 40 meets an abutment stroke end 210 placed in the lower portion of the cover 21 of the motor 20 body.

At this point, the rod 40 stops but the piston 22 continues its stroke upwards for a short stretch as said piston 22 can continue to slide towards the other one thanks to the through hole 26a.

As the springs 33a are fixed on one side to the pin 26b on the rod 40, and on the other side to the hinge 33b, they are placed in traction and are inclined gradually downwards assuming a greater inclination than that of the connecting rods 33.

At that point the spring mechanism is triggered and the connecting rods 33 are brought from the position in which they were in contact with the upper surface 38b of the hole of the slot 38 to a position in which they come into contact with the lower surface 38a of the hole of the slot 38.

Thus the connecting rods 33 open the internal valve 36, because the shutter 36a of the internal valve 36 moves away from the valve seat 36b and simultaneously, causing the rotation of the rocker 27, close the external valve 37.

Therefore, in the first place the thrust of the main fluid on the lower surface of the piston 22 is missing and at the same time the upper chamber 25 is also filled with fluid that passes through the open internal valve 36.

The piston 22 therefore starts to descend towards the bottom dead centre until the rod 40 comes into contact with the shank 28.

The movement towards the bottom dead centre of the piston 22 is also transmitted to the small doser piston 62 and the friction gasket 64 reaches the open position of the openings 62a so as to let the auxiliary fluid flow through.

At this point, the rod 40 stops but the piston 22 continues its descent for a short stretch as said piston 22 can still slide with respect to the rod 40 making use of the through hole 26a.

The springs 33a are again placed in traction and are inclined, this time upwards, gradually assuming a greater inclination than that of the connecting rods 33.

At that point the spring mechanism is triggered again and the connecting rods 33 are snapped from the position in which they were in contact with the lower surface 38a of the slot 38 to a position in which they come into contact with the upper surface 38b of the slot 38.

In this way they close the internal valve 36 and simultaneously open the external valve 37 and the cycle starts again with the methods previously seen.

Clearly, modifications or improvements dictated by specific or contingent needs can be made to the invention thus described, without thereby departing from the scope of the invention as claimed below.

The invention claimed is:

1. A proportional volumetric doser comprising a motor, provided with an inlet conduit of a main fluid and an outlet conduit, and a pump adapted to supply an auxiliary fluid to the motor, which pump comprises a tubular sleeve inside which a cylinder is housed in which a small doser piston slides, mechanically connected to an output shaft of the motor, wherein an inner surface of the cylinder and the small piston partially define a dosing chamber of an auxiliary fluid to be mixed in the motor in a prefixed quantity with the main fluid, where said cylinder has a threaded outer portion that meshes with a threaded portion of a ring nut so that a rotation of the ring nut causes an axial translation of the cylinder and the volume variation of the dosing chamber, wherein the sleeve comprises a locking system configured to mechanically lock the cylinder with respect to the tubular sleeve by creating a shape constraint.

2. The proportional volumetric doser according to claim 1, wherein the shape constraint is created by acting radially on an outer surface of the ring nut.

3. The proportional volumetric doser according to claim 2, wherein the locking system comprises a lever that has a portion, provided with reliefs and/or grooves, adapted to be engaged with a corresponding outer portion of the ring nut, provided with reliefs and/or grooves to create a shape constraint with the reliefs and/or grooves of the portion.

4. The proportional volumetric doser according to claim 3, wherein the lever is housed in a seat of the tubular sleeve and comprises a hinge and a spring configured to keep the portion of the lever in contact with the outer portion of the ring nut.

5. The proportional volumetric doser according to claim 3, further comprising a safety device selectively activatable between a first position, in which the safety device generates on the lever a force such as to keep the portion of the lever in contact with the outer portion of the ring nut, and a second position, in which the safety device allows radial clearance between said portions.

6. The proportional volumetric doser according to claim 1, wherein the ring nut has an enlarged end that is housed in a conjugated annular hollow obtained in an enlarged end portion of the tubular sleeve with which a closing cover is associated, configured to keep the enlarged end of the ring nut in the annular hollow obtained in an enlarged end portion of the tubular sleeve.

7. The proportional volumetric doser according to claim 1, wherein the cylinder comprises a seat for receiving a one-way valve positioned at a distal end from the motor.

8. The proportional volumetric doser according to claim 7, further comprising a second one-way valve separated from the first one-way valve by a tube.

9. The proportional volumetric doser according to claim 1, wherein the motor comprises a body inside which a piston slides connected to the output shaft of the motor, which divides the internal volume of the body of the motor into a first chamber in communication with the inlet conduit of the main fluid and a second chamber in communication with the outlet conduit, where the first and the second chamber are placed in communication with one another by means of a system of valves associated with the piston and activatable for placing the piston in movement.

10. The proportional volumetric doser according to claim 1, wherein there is at least one bleed hole on the motor.

11. The proportional volumetric doser according to claim 4, further comprising a safety device selectively activatable between a first position, in which the safety device generates on the lever a force such as to keep the portion of the lever in contact with the outer portion of the ring nut, and a second position, in which the safety device allows radial clearance between said portions.

* * * * *